United States Patent [19]

Solomon et al.

[11] 4,379,772

[45] Apr. 12, 1983

[54] METHOD FOR FORMING AN ELECTRODE ACTIVE LAYER OR SHEET

[75] Inventors: Frank Solomon, Great Neck, N.Y.; Charles Grun, Matawan, N.J.

[73] Assignee: Diamond Shamrock Corporation, Dallas, Tex.

[21] Appl. No.: 202,576

[22] Filed: Oct. 31, 1980

[51] Int. Cl.$^3$ .................... B29D 27/00; C25B 14/04; C25B 11/12

[52] U.S. Cl. .................... 264/49; 204/290 R; 204/292; 204/294; 264/122; 264/DIG. 47

[58] Field of Search ......... 264/49, 122, 127, DIG. 47; 204/290 R, 292, 294

[56] References Cited

U.S. PATENT DOCUMENTS

| | | | |
|---|---|---|---|
| 3,003,304 | 10/1961 | Rasmussen | 264/DIG. 47 |
| 3,499,822 | 3/1970 | Rasmussen | 264/DIG. 47 |
| 3,500,626 | 3/1970 | Sandiford | 264/DIG. 47 |
| 3,548,048 | 12/1970 | Hughes et al. | 264/DIG. 47 |
| 3,658,976 | 4/1972 | Slade | 264/122 X |
| 3,838,064 | 9/1974 | Vogt et al. | 152/384 |
| 3,838,092 | 9/1974 | Vogt et al. | 260/33.6 F |
| 3,930,979 | 1/1976 | Vallance | 264/49 X |
| 3,943,006 | 3/1976 | Baker et al. | 264/49 X |
| 4,096,227 | 6/1978 | Gore | 264/122 X |
| 4,153,661 | 5/1979 | Ree et al. | 264/122 X |
| 4,194,040 | 3/1980 | Breton et al. | 264/122 X |
| 4,337,140 | 6/1982 | Solomon | 204/294 X |
| 4,338,181 | 7/1982 | Solomon | 204/294 |

FOREIGN PATENT DOCUMENTS 1284054 8/1972 United Kingdom .

OTHER PUBLICATIONS

Iliev, I., *Journal of Power Sources*, 1, "On the Effect of Various Active Carbon Catalysts on the Behavior of Carbon Gas-Difusion Air Electrodes: 1, Alkaline Solutions", pp. 35–46, 1976/1977.

Landi, H. P. et al., *Advances in Chemistry Series*, "A Novel Air Electrode", pp. 13–23, 1969.

*Primary Examiner*—Philip E. Anderson
*Attorney, Agent, or Firm*—John P. Hazzard; Woodrow W. Ban

[57] ABSTRACT

The present disclosure is directed to an electrode active layer or sheet containing from about 60 to about 85 wt. % active carbon in intimate admixture with 15 to 40 wt. % fibrillated PTFE. This electrode has improved strength and is capable of operation at high current density with resistance to mechanical failure due to blistering of the electrode, and to a process for producing same. The process is characterized by combining a dilute dispersion of smaller polytetrafluoroethylene particles with a suspension of catalyzed or uncatalyzed larger active carbon particles to discontinuously coat active carbon with PTFE; fibrillating same; comminuting said fibrillated PTFE/active carbon mix; and then rolling same into a self-sustaining, coherent sheet form. Alternatively, the sheet form can be provided by deposition of the heat treated polytetrafluoroethylenated active carbon on a filter paper or like medium.

10 Claims, No Drawings

METHOD FOR FORMING AN ELECTRODE ACTIVE LAYER OR SHEET

FIELDS OF THE INVENTION

The present invention is directed to an improvement electrode active layer particularly well suited for use as an active layer for an oxygen (air) cathode, and a process for forming it. The resulting coherent, self-sustaining active layer sheet can be subsequently employed as the active layer when laminated to a backing (wetproofing) sheet and a current distribution to form an oxygen (air) cathode having high durability and resistance to break down due to the corrosive environment present in a chloralkali cell. In other words, the active layer of this invention when incorporated in an air electrode is capable of achieving extended life with a low rate of decline in operating voltage.

BACKGROUND OF THE INVENTION

In the field of electrochemistry there is a well known electrochemical cell known as a chlor-alkali cell. In this cell, an electric current is passed through a saturated brine (sodium chloride salt) solution to produce chlorine gas and caustic soda (sodium hydroxide). A large portion of the chlorine and caustic soda for the chemical and plastics industries is produced in chlor-alkali cells.

Such cells are divided by a separator into anode and cathode compartments. The separator characteristically can be a substantially hydraulically impermeable cation exchange membrane such as the commercially available NAFION manufactured by the E. I. duPont Nemours and Co. Alternatively the separator can be a porous diaphragm, e.g. asbestos which can be in the form of vacuum deposited fibers or asbestos paper sheet as are well known in the art. The anode can be a valve metal, e.g., titanium, provided with a precious metal coating to yield what is known in the art as a dimensionally stable anode. The cathodes employed in such chlor-alkali cells are generally steel. At these cathodes both caustic soda and hydrogen are produced with chlorine being produced at the anode. This is a very energy intensive process.

One of the unwanted byproducts present in such chlor-alkali cells is hydrogen which forms at the cell cathode. This hydrogen increases the power requirement for the overall electrochemical process and eliminating its formation is one of the desired results in chlor-alkali cell operation. It has been estimated that 25% of the electrical energy required to operate a chlor-alkali cell is utilized in the formation of hydrogen at the cathode. Hence, the prevention of hydrogen formation can lead to substantial energy conservation and savings in the cost of electricity required to operate the cell. In an attempt to achieve cost savings and energy conservation in operating chlor-alkali cells, attention has been directed to what are known as oxygen (air) cathodes. These cathodes prevent the formation of hydrogen at the cathode and enhance the formation of hydroxyl groups resulting in alkali which can be readily removed as product. Savings in cost for, and conservation of, electrical energy are thereby achieved.

One form of oxygen (air) cathode involves use of an active layer containing porous active carbon particles, which may or may not be catalyzed using noble metal catalyst, such as, silver, platinum, etc. The active carbon particles become flooded with the caustic soda thereby significantly reducing their ability to catalyze the formation of hydroxyl groups at the air cathode and resulting in a loss of activity of the air cathode. Some attempts to overcome this difficulty involve incorporating hydrophobic materials, e.g., polytetrafluoroethylene (PTFE) in such active layers in particulate or fibrillated (greatly attenuated and elongated) form to impart hydrophobicity to the active carbon layer, per se. Other approaches at combatting this problem utilize PTFE in a protective or backing sheet which can be laminated or otherwise attached to the active layer. Still other proposed solutions involve use of PTFE in both the active layer and in a backing sheet secured thereto. Such composite active layers, however, are often subjected to loss of strength resulting in failure combined with blistering of the electrode particularly in the active layer when the chlor-alkali cell is operated at high current densities, viz., current densities of from about 250 milliamperes/cm$^2$ and higher.

U.S. Pat. No. 3,838,064 to John W. Vogt et al is directed to a process for dust control involving mixing a finely divided fibrillatable polytetrafluoroethylene with a material which characteristically forms a dust to form a dry mixture followed by sufficient working to essentially avoid dusting. Very small concentrations of PTFE, e.g., from about 0.02 to about 3% by weight are applied to achieve the dust control. Corresponding U.S. Pat. No. 3,838,092 also to Vogt et al is directed to dustless compositions containing fiberous polytetrafluoroethylene in concentrations of about 0.02% to less than 1%, e.g., about 0.75% by weight of PTFE based on total solids.

An article entitled "ON THE EFFECT ON VARIOUS ACTIVE CARBON CATALYSTS ON THE BEHAVIOR OF CARBON GAS-DIFUSION AIR ELECTRODES: 1. ALKALINE SOLUTIONS" by I. Iliev et al appearing in the Journal Of Power Sources, 1 (1976/1977) 35,46 Elsevier Sequoia S.A, Lausanne-printed in The Netherlands, at pages 35 to 46 of said Journal is directed to double-layer, fixed-zone polytetrafluoroethylene-bonded carbon electrodes having a gas supplying layer of carbon black "XC" wetproofed with 35% Teflon and an active layer consisting of a 30 mg/cm$^2$ mixture of the same wetproofed material "XC-35" and active carbon (weight ratio of 1:2.5). These electrodes were sintered at 350° C. under pressure of 200 kg/cm$^2$ and employed as oxygen(air) cathodes in alkaline test environments.

The present invention is readily distinguishable from the oxygen (air) cathodes described by Iliev et al in that according to this invention, larger active carbon particles are polytetrafluoroethyleneated (discontinuously coated with much smaller PTFE particles) with subsequent fibrillation followed by heat treating and forming into a coherent, self-sustaining sheet without sintering. The active layers of this invention, when incorporated into an electrode, result in an active layer having a desirable combination of tensile strength with resistance to blistering under high current densities in use. It will be observed the conditions employed in formation of the active layer of this invention, are insufficient to effect sintering of the PTFE contained therein.

British Pat. No. 1,284,054 to Boden et al is directed to forming an air-breathing electrode containing an electrolyte within an air-depolarized cell. This air-breathing electrode is made by hot pressing a fluoropolymer sheet, containing a pore-forming agent, on to a catalyst composition (containing silver) and metallic grid member. According to page 3 of said British patent, the PTFE-pore-forming agent-paraffin wax containing wetproofing sheet is subjected to a solvent wash to remove the paraffin wax (lubricant and binder) and then sintered in a sintering furnace at the appropriate temperatures for sintering and while it still contains the pore-forming particles. It is then ready for application to the catalyst composition of the air electrode for the hot pressing operation. Hot pressing involves the use of pressures ranging from about 5,000 about 30,000 psi in conjunction with temperatures ranging from 200° F. to 400° F. The process of the present invention is readily distinguishable from said Boden et al British Pat. No. 1,284,054 in that the present invention avoids the use of wax, avoids the trouble and expense of removing wax and does not employ sintering and high pressures. Moreover Boden et al do not use a discrete active layer containing catalyst in their process.

The publication "Advances in Chemistry Series," copyright 1969, Robert F. Gould (Editor), American Chemical Society Publications, contains at pages 13 to 23 an article entitled "A Novel Air Electrode" by H. P. Landi et al. The electrode described contains 2 to 8 percent PTFE, is produced without sintering and is composed of graphitic carbon (ACCO Graphite) or metallized graphite carbon particles blended with a PTFE latex and a thermoplastic molding compound to form an interconnected network which enmeshes the filler particles. This blend is molded into a flat sheet and the thermoplastic is then extracted. The present process employs non-graphitic active carbons, significantly higher concentrations of PTFE in the active layer while avoiding the use of thermoplastic molding compound and avoiding the necessity to remove same. Also, the active layer of this invention is formed by rolling a prefibrillated granular mix and no molding step is necessary. No indication is given by Landi et al as to the stability and durability of their air electrode and no life testing or data is included in said article.

BRIEF SUMMARY OF THE INVENTION

There is disclosed herein an electrode active layer or sheet containing from about 60 to 85 wt.% active carbon, the remainder being insintered, fibrillated polytetrafluoroethylene. The active carbon particles preferably have a particle size of about 5 to 30 microns, an ash content of less than about 4 wt. %, a B.E.T, surface area of about 1000 $m^2/g$ and higher and contain a precious metal catalyst, e.g. platium, silver, etc. The active layer is made by a process of adding a dilute dispersion of polytetrafluoroethylene particles to a suspension of larger active carbon particles to discontinuously coat same; fibrillating the discontainously coated particles to form a mix, comminating the fibrillated mix to yield a granular mix; and forming the granular mix into sheet form, preferably rolling it at temperatures of from about 140° to 180° F.

DESCRIPTION OF THE INVENTION

The present invention is based upon the discovery that the aforementioned blistering and structural strength problems encountered previously at high current densities in composite electrodes can be substantially overcome by a process resulting in formation of a strong, electrode active layer by hot rolling an intimate PTFE/active carbon prefibrillated granular mix and involving: adding a dilute dispersion containing from about 1 to 10 weight percent of polytetrafluoroethylene particles having particle sizes ranging from about 0.05 to 0.5 microns to active carbon particles having from 1 to 30 microns particle size to polytetrafluoroethylenate said active carbon viz., provide same with a discontinuous coating of adherent smaller PTFE particles, thus yielding a polytetrafluoroethylenated mix containing about 60 to 85 wt.% of catalyzed or uncatalyzed active carbon with the remainder being PTFE; briefly chopping this fibrillated polytetrafluoroethylenated, active carbon to form a granular mix and then hot rolling the chopped granulated mix into sheet form. Where it is desired to form ultra thin electrode active layers, the fibrillated polytetrafluoroethylenated active carbon can be deposited upon a filter paper (as a forming medium), pressed and then used as the active layer in an oxygen (air) cathode.

The polytetrafluoroethylenated active carbon can be fibrillated at ambient or higher temperatures, viz., about 15° to 75° C., and more preferably at about 50° C. by shear blending in a suitable blender, e.g., a Brabender Prep Center typically using medium shear cams or blades for about 2 to 10 minutes and more preferably for about 4 to 6 minutes. After such fibrillating, which compresses and greatly attenuates the particulate PTFE; the mixture is noted to be fibrous and hence the term "fiberizing" can be utilized herein as synonymous with fibrillating.

The coherent, self-sustaining active layer sheets rolled from the fiberized material characteristically displayed greater tensile strength and in-use durability than sintered unfiberized sheets. Life testing of the fibrillated active layer sheets of this invention resulted in approximately 6,000 hours life at 200+milliamps/$cm^2$ in 38% aqueous potassium hydroxide before failure by blistering.

The ability to form active layers in sheet form by hot rolling facilitates making active layer in a continuous manner resulting in an active layer material uniform in thickness and composition by a process which is easy to administer and control.

The active carbon particles whose use is contemplated herein are preferably previously deashed and optionally particle size classified active carbon, usually having a particle size ranging from about 10 to about 20 microns which has been deashed by separately contacting it with caustic at elevated temperatures and with acid to remove a substantial amount of the ash (oxides) from the carbon prior to catalyzing same. The deashing of active carbon constitutes the subject matter of copending U.S. patent application Ser. No. 202,580 filed of even date herewith in the name of Frank Solomon as inventor and entitled "Active Carbon Conditioning Process." The disclosure of this application is incorporated herein by reference. The thus deashed, optionally classified, active carbon particles are preferably then catalyzed with a precious metal viz., subjected to contact with a silver or platinum precursor followed by chemical reduction with or without heat to deposit silver, platinum or other respective precious metal substantially on and/or within the pores of the active carbon, followed by filtration and drying at temperatures ranging from about 110° to 180° C. with or without vacuum to produce catalyzed active carbon particles.

These particles are then formulated into an aqueous suspension with stirring to prepare it for polytetrafluoroethylenation by gradual addition thereto of a dispersion of PTFE as noted above. Prior to fibrillation, the polytetrafluoroethylenated active carbon can be blended or mixed with a soluble or volatile particulate pore-forming agent, e.g., sodium carbonate, ammonium benzoate, etc. having a particle size of about 0.1 to 40 microns and more usually about 0.5 to 20 microns. A pore-forming agent may be used to enhance the permeability of the active layer.

The previously polytetrafluoroethylenated active carbon or active carbon-pore-forming agent mixture is then fibrillated using a Brabender Prep Center (D 101) with medium shear blade or cam with a charge of about 25 g. of mix. The fibrillation is performed for approximately 1 to 20 minutes at 20 to 120 revolutions per minute at ambient temperatures, viz., 15° to 25° C., e.g., 20° C.

During this fibrillation step, the polytetrafluoroethylenated active carbon is subjected to shear blending forces, viz., a combination of compression and attenuation which has the effect of substantially lenghtening the PTFE in the presence of the remaining component(s). Fibrillation increases the strength of the resulting active layer sheets formed from the fibrillated polytetrafluoroethylenated active carbon.

After fibrillation, and before forming the active layer sheets, the fibrillated mix can be chopped or otherwise comminuted for 1 to 60 seconds to yield a granulated mix.

Subsequent to chopping, the fibrillated polytetrafluoroethylenated active carbon is heated at from, about 60° to 90° C. and usually at temperatures ranging from about 75° to 85° C. and passed through six inch diameter chrome-plated steel rolls at roll gaps of 5 to 25 mils, and more usually 5 to 10 mils, viz., 0.005 to 0.010 inch. In place of forming the active layer by hot rolling, the active layer can be deposited on a salt bed on paper filter media. The active layer is formed using conditions of temperature and pressure so as to avoid sintering the PTFE.

The pore-former, if one were previously incorporated into the active layer, can be then removed, e.g., by washing or heating the thus-formed sheet depending on whether a soluble or volatile pore-former was used. Alternatively the removal of the pore former can be deferred until after laminating the active layer to a current distributor and hydrophobic backing. In the event no pore former is employed; the sheet can be used (as is) as the active catalyst containing layer of an oxygen (air) cathode, e.g., for use in a chlor-alkali cell, fuel cell, zinc-air battery, etc.

A variety of active carbons can be used herein. Active carbon is contemplated herein for use both in its unmodified (uncatalyzed) form and as catalyzed or activated with various procedures for deposition of catalytic materials therein or thereon, e.g., precious metals, such as, silver, platinum, palladium, spinels, e.g., mixed oxides of nickel and cobalt, such as Ni $CO_2O_4$; perovskites, e.g., $CaTiO_3$, etc., as described at pages 54, 55 et seq. of *ADVANCED INORGANIC CHEMISTRY* by F. Albert Cotton and Geoffrey Wilkinson, Third Edition, INTERSCIENCE PUBLISHERS.

Said active carbon particles (after conditioning as per Ser. No. 202,580 usually have a B.E.T. surface area of 1000 square meters per gram ($m^2/g$) and higher combined with an ash content of less than about 4 wt. percent. This is accomplished by deashing said active carbon (before catalyzing it) by separately contacting it with an alkali at elevated temperatures and with an acid. The term "B.E.T." surface area refers to the well known method of determining surface area according to nitrogen absorption developed by Brunauer, Emmett and Teller.

The active carbon whose use is contemplated herein encompasses a variety of materials which, in general, prior to deashing encompasses a variety of amorphous carbonaceous materials generally of vegetable origin which contain inorganic residue, e.g., non-carbonaceous oxides collectively designated as ash.

In accordance with a preferred embodiment of this invention, the active carbon starting material is "RB" carbon which is a form of active carbon manufactured by Calgon, a division of Merck, and is made from bituminous coal by known procedures. This material can contain as much as approximately 23% of various oxides and components which can be collectively classified as ash. Typical analysis of the ash contained in RB carbon is as follows:

| Component | Weight Concentration |
|---|---|
| Silica | 43.34 |
| Alumina ($Al_2O_3$) | 29.11 |
| Iron Oxides ($Fe_2O_3$) | 20.73 |
| Others | 6.82 |

The sequential pretreatment process of Ser. No. 202,580 does not totally remove the ash content from the active carbon; but results in a substantial reduction thereof, viz., from about 70-80% or more of the ash is removed by said process.

The initial stage of treatment constitutes separately contacting the active particles as obtained, e.g., RB carbon as mentioned above, with either an acid or an alkali at elevated temperature (100° to 130° C.) followed by contact with the other. For example, during the base contacting stage, the alkali material, such as sodium hydroxide, potassium hydroxide, etc., is maintained at elevated temperatures ranging from about 90° to about 140° C., using several contacting steps over time periods of e.g., about 0.5 to 24 hours, interspersed with one or more intermittent water washing step(s).

Then the thus treated active carbon is contacted with an acid, such as hydrochloric acid, for similar extended time periods at ambient temperatures. Between the alkali and acid contacting phases, the active carbon particles can optionally be dried. However, drying is not required. Usually, the alkali is employed in the form of an aqueous solution containing from 28 to 55, and more usually from 35 to 45 wt. % alkali based on total solution. The acid content of the aqueous acid solution customarily ranges from 10 to 30 wt. % and more usually from 15 to 25 wt. % acid based on total solution.

Prior to contact with the alkali solution, it has been found desirable to first comminute, e.g., ball mill or otherwise divide up the active carbon particles as purchased. For example, RB active carbon was ball milled for 2 to 6 hours, and more usually about 4 hours, to reduce its particle size to from about 5 to 30 microns.

Similarly the acid washing can be accomplished in several discrete washing steps rather than all at one time. Additionally, the contact with acid can be accomplished at lower temperatures for longer time periods. For example, the acid wash can be conducted overnight (approximately 16 hours) at room temperature. As with the alkali stage, after the acid contact; preferably the active carbon particles are water washed to remove acid and then dried. Alternatively the acid contact stage can be done at elevated temperatures using a Soxhlet extraction constant reflux apparatus, e.g., using HCl, HBr, etc., at 100° to 130° C., viz., constant boiling mineral acids, each having its respective boiling range, for about 0.5 hour or less. While many acids, may suitably be used, the acid of choice is hydrochloric acid.

The deashing results in substantial reduction of the aforementioned ash content of the active carbon particles. Typically when using active carbon having 10 to 23 wt. % ash content and an initial B.E.T. surface area of 600 to 1500 $m^2/g$ (before deashing), reductions of ash content to from 1.6 to 3.6 wt. % and increases in B.E.T. surface area as much as fifty (50) percent are produced by such deashing.

Commercially available "RB carbon" was found to have an ash content of approximately 12% as received. This "RB carbon" was treated in 38% KOH for 16 hours at 115° C. and found to contain 5.6% ash content after a subsequent furnace operation. The alkali-treated "RB carbon" was then treated (immersed) for 16 hours at room temperature in 1:1 aqueous hydrochloric acid (20% concentration). The resulting ash content had been reduced to 2.8%.

The deashed particles are then catalyzed by contact with a precursor of a precious metal catalyst. In the event that silver is to be deposited within the pores of the active carbon, it is preferred to soak the carbon in an aqueous solution of silver nitrate followed by removal of excess silver nitrate and chemical reduction of silver nitrate soaked carbon with aqueous alkaline formaldehyde. Preferably this is done as described and claimed in U.S. patent application Ser. No. 202,579 assigned to Diamond Shamrock Corporation, Dallas, Tx. filed in the name of Frank Solomon of even date herewith and herewith and entitled "Process for Catalyst Preparation". The disclosure of this application is incorporated herein by reference.

On the other hand in the event that it is desired to deposit platinum within the pores of the active carbon material, chloroplatinic acid viz., $H_2Pt\ Cl_6.6H_2O$, is one preferred precursor followed by removal of excess chloroplatinic acid and chemical reduction using alkaline sodium borohydride or formaldehyde as a reducing agent. The reduction can be accompanied with the use of heat or it can be done at ambient room temperatures. According to another preferred embodiment, the platinum is derived from $H_3Pt(SO_3)_2OH$ by the procedure set forth in U.S. Pat. No. 4,044,193. After catalysis, the active carbon particles are filtered and vacuumed dried in preparation for polytetrafluoroethylenation.

Polytetrafluoroethylenated fibrillated, active carbon-containing active layers produced in accordance with this invention characteristically have thicknesses of 0.005 to 0.025 (5 to 25 mils) with corresponding tensile strengths ranging from about 100 to 200 psi as compared to tensile strengths of 50 to 80 psi for unfibrillated active layers.

The invention will be further illustrated in the examples which follow in which all percents, parts and ratios are by weight unless otherwise indicated.

EXAMPLE 1

100 g. of RB active carbon were ball milled for 4 hours in water. This carbon was subsequently treated with 1600 ml of 38% NaOH for an hour at 100°–120° C. with stirring. It was then filtered and washed. This treatment was repeated three times, then followed by a room temperature overnight soak in 1:1 HCL, and a final washing and drying in air at 110° C.

20 g. of carbon so prepared were then platinized in a ratio of 28 parts of carbon to 1 part Pt, using $H_3Pt(SO_3)_2OH$ in accordance with the procedure of U.S. Pat. No. 4,044,193. Twenty (20) grams of carbon were suspended in 333 ml of water, and 3.57 ml of $H_3Pt(SO_3)_2OH$ (200 g. Pt/liter solution) were added and then decomposed to hydrous platinum oxide by the addition of 8.6 ml. of 35%$H_2O_2$. After filtering, washing, and air drying at 140° C., the catalyzed carbon was ready for the next step, polytetrafluoroethylenation.

20 g. of catalyzed carbon were suspended in 300 ml. water with stirring. 8.4 ml. of Teflon 30 dispersion were separately diluted in 300 ml. of water. The diluted Teflon 30 dispersion was slowly added to the carbon suspension. After coagulation, the mixture was washed and dried.

The mix was weighed and was found to be 25 g. The 25 g. mix was then fibrillated by shear blending in the Brabender Prep Center, in measuring head type R.E.O.-6 using medium shear cams or blades. The mix was lubricated with 28 cc. of 30% isopropanol in water and was kneaded for 2½ minutes at 25 RPM. It was then vacuum dried.

3 g. of mix were chopped 30 seconds in Varco Mod. 228-1 coffee grinder (made in France); and then rolled at 75° C. through 6 inch diameter rolls at a roll separation of 0.007 inches. The rolled sheet was 0.010 inches thick. At this point, the sheet (coded E-413) was ready for incorporation into an electrode.

EXAMPLE 2

Active carbon was prepared as recited in Example 1, up to the point of catalyzing.

To catalyze the carbon, 16.7 g. of carbon were suspended in 396 ml. $H_2O$ containing 21.3 g. $AgNO_3$ and stirred for two hours.

The carbon was then filtered to remove all excess liquid and the filter cake was then slurried in a previously prepared solution of 250 ml. $H_2O$, 25 ml. 30% NaOH, and 18.3 ml. of 37% $CH_2O$, and was held at 85° C. for 60 minutes with continuous stirring.

The resulting silvered carbon was then washed and dried, and processed to sheet material following the steps of Example 1 in the same sequence, with only minor variations.

The resultant sheet material was coded E-305. Its carbon to silver ratio was 5:1.

EXAMPLE 3

A third sheet material was prepared in exactly the same manner as those described in Examples 1 and 2 with the exception that the catalyzing step was omitted. The code for this material was E421.

EXAMPLE 4

Electrodes were prepared from each of the above sheets by laminating a current distributor, silver plated 50×50×0.005 nickel wire cloth, and a hydrophobic gas diffusion (backing) layer containing 65% sodium carbonate and 35% Teflon to each of the active layer sheets with the current distributor being in contact with the working surface of the active layer and the opposite surface in contact with the backing layer. The backing layer was prepared as follows:

Two hundred cubic centimeters of isopropyl alcohol were poured into an "Osterizer" blender. Then 49 grams of duPont 6A polytetrafluoroethylene were placed in the blender and the PTFE-alcohol dispersion was blended at the "blend" position for approximately one minute. The resulting slurry had a thick pasty consistency. Then another 100 cc of isopropyl alcohol were added in the blender and the mixture was blended (again at the "blend" position) for an additional two minutes.

Then 91 grams of particulate sodium carbonate in isopropanol (Ball milled and having an average particle size of approximately 3.5 microns, as determined by a Fisher Sub Sieve Sizer) were added to the blender. This PTFE-sodium carbonate mixture was then blended at the "blend" position in the "Osterizer" blender for three minutes followed by a higher speed blending at the "liquefying" position for an additional one minute. The resulting PTFE-sodium carbonate slurry was then poured from the blender on to a Buchner funnel and filtered and then placed in an oven at 80° C. where it was dried for three hours resulting in 136.2 grams yield of PTFE-sodium carbonate mixture. This mixture contained approximately 35 weight parts of PTFE and 65 weight parts of sodium carbonate.

This mixture was mildly fibrillated in a Brabender Prep Center with attached Sigma mixer as described above.

After fibrillating, which compresses and greatly attenuates the PTFE, the fibrillated material is chopped to a fine dry powder using a coffee blender, i.e., Type Varco, Inc. Model 228.1.00 made in France. Chopping to the desired extent takes from about 5 to 10 seconds because the mix is friable. The extent of chopping can be varied as long as the material is finely chopped.

The chopped PTFE-$Na_2CO_3$ mix is fed to six inch diameter chrome-plated steel rolls heated to about 80° C. Typically these rolls are set at a gap of 0.008 inch (8 mils) for this operation. The sheets are formed directly in one pass and are ready for use as backing layers in forming electrodes, e.g., oxygen cathodes, with no further processing beyond cutting, trimming to size and the like.

The lamination is done in a hydraulic press at 8.5 tons per square inch and 115° C. and is followed by washing to remove pore-former, and drying.

The test electrodes whose results are described and tabulated below have the designations:

E413 (Pt catalyst—Example 1)
E305 (Ag catalyst—Example 2)
E421 (no catalyst—Example 3)

The electrodes were mounted in test cells which were filled with 30% NaOH at 80° C.±5° C. Air ($CO_2$-free) flowed across the gas side at four times the theoretical requirement at each current density checked. Voltage was indicated by an Hg—HgO reference electrode which communicated with the test electrode by a Luggin capillary. An inert counter electrode served as anode of the cell while the electrodes were tested as air depolarized cathodes.

The table below indicates the results obtained.

| Current Density Milliamps/$cm^2$ | Voltage Vs Hg/HgO Reference | | |
|---|---|---|---|
| | E413 | E305 | E421 |
| 40 | −.09 | −.12 | −.13 |
| 117 | −.14 | −.17 | −.16 |
| 196 | −.17 | −.19 | −.18 |
| 276 | −.20 | −.23 | −.19 |
| 355 | −.24 | −.28 | −.22 |
| 500 | −.39 | −.44 | −.35 |

It will be noted that differences between electrodes are small. Performance of all electrodes cited is considered high.

What is claimed is:

1. A process for forming active layer or sheet comprising adding a dilute aqueous dispersion of polytetrafluoroethylene particles to an aqueous suspension of larger active carbon particles to discontinuously coat said active carbon particles with smaller polytetrafluoroethylene particles; fibrillating said discontinuously coated particles by shear blending at between about 15° C. and 75° C. to form an intimate mix of carbon particles having attenuated adherent polytetrafluoroethylene particles; chopping said intimate mix to yield a granular mix to reduce any compression of the intimate mix during shear blending and nonsinteringly forming said granular mix into a sheet.

2. A process as in claim 1 wherein said granular mix is formed by rolling at temperatures of from about 60° to 90° C.

3. A process as in claim 1 wherein said active carbon particles have a particle size ranging from about 1 to 30 microns.

4. A process as in claim 1 wherein a soluble or volatile particulate pore-forming agent is added to said suspension and blended therewith prior to fibrillating and the pore-forming agent is subsequently removes from the sheet.

5. A process as in claim 1 wherein said granular mix is formed by filtration upon a salt bed filter medium.

6. A process as in claim 1 wherein said granular mix contains from about 60 to 85 wt.% active carbon the remainder being polytetrafluoroethylene.

7. A process as in claim 1 wherein said active carbon particles have an ash content of less than about 4 wt.% and a B.E.T. surface area of about 1000 $m^2$/g and higher.

8. A process as in claim 1 which includes depositing a precious metal catalyst on said active carbon particles before adding said dilute polytetrafluoroethylene dispersion thereto.

9. A process as in claim 8 wherein said precious metal is platinum.

10. A process as in claim 8 wherein said precious metal is silver.

* * * * *